3,025,237
SECONDARY RECOVERY USING A WATER FLOODING TECHNIQUE
Robert Roper, Roselle, N.J., assignor to Jersey Production Research Company, a corporation of Delaware
No Drawing. Filed Nov. 28, 1958, Ser. No. 776,703
14 Claims. (Cl. 252—8.55)

The present invention is concerned with a secondary recovery operation for obtaining oil from subterranean reservoirs. The invention is more particularly directed to a secondary recovery procedure wherein a fluid such as water is employed as a driving medium. The invention is especially concerned with an improved type viscous water flooding process in which fingering and oil reservoir bypassing on the part of the fluid is substantially reduced by the utilization of a particular class of water thickening agents. These agents are selected from the class of alcohol adducts of copolymers of ethylenically unsaturated compounds and maleic anhydride. Preferred agents are alcohol adducts of vinyl aromatic maleic anhydride copolymers.

Specifically, copolymers of vinyl compounds such as styrene or ethylene and maleic anhydrides are reacted with alcohols such as methanol, ethanol, or iso-propanol to produce polymers containing aliphatic side chains. These materials produce high viscosities in aqueous solution and have good thermal stability, and are therefore advantageously used as water thickeners in the water flooding of oil reservoirs.

Although in the past there have been substantial advances in primary recovery methods for the recovery of oil from subterranean reservoirs, nevertheless a substantial portion of the oil remains in the reservoir after termination of the primary recovery methods. It is estimated that only about 30 to 50% of the oil is economically recoverable by primary recovery techniques. A greater amount may be recovered by other secondary techniques, such as re-pressuring treatments following the primary method.

Thus, there exists a great interest in secondary recovery methods. Secondary recovery is the augmentation of remaining reservoir energy after depletion by primary recovery methods. The reservoir energy is augmented by drilling one or more injection wells into a permeable oil bearing formation within suitable proximity to a producing well or wells which are drilled into this same permeable oil bearing formation. Injection of liquids or gases through the injection well is generally effective in increasing the oil production from the producing well or wells. This technique of secondary recovery enables the recovery of substantially more oil than can be produced by primary recovery methods.

As pointed out, the use of secondary recovery procedures for removing oil from subterranean oil reservoirs is well known in the petroleum industry. It is the function of such procedures to make possible the recovery of oil from reservoirs after primary production methods are uneconomical. In general, all secondary recovery procedures employ a driving medium such as a liquid or gas for displacing additional oil from a reservoir. The displacing medium, usually a fluid, is injected into a reservoir as by means of one or more of the original wells or by means of entirely new wells; and the oil in the reservoir is displaced toward and withdrawn from other remaining wells.

Due partially to its ready availability in many regions, water has been extensively employed as a driving medium in secondary oil recovery programs. This medium, however, has been found to possess several serious shortcomings. One particularly noteworthy shortcoming lies in the fact that a water drive frequently "fingers" and tends to bypass substantial portions of an oil reservoir. It is known that oil reservoirs possess regions and strata of different permeabilities; and apparently the water flows much more rapidly through some reservoir flow paths than it does through others. The net result of this occurrence is that water flooding often completely misses substantial portions of a reservoir.

It is well to note that oil reservoir fluids and crude oils vary greatly in viscosity—some being as low as 1 or 2 c.p.s. and some ranging up to 1000 c.p.s. or even more. It is also well known that water flooding as well as other secondary recovery procedures perform less satisfactorily with viscous crude oils and reservoir fluids than with relatively non-viscous crude oils and reservoir fluids.

Accordingly, several procedures have been suggested to date for improving the mechanics of water flooding procedures, particularly with a view to reducing the degree of fingering and bypassing. One suggestion has been to increase the viscosity of the water drive relative to the oil (i.e., the water/oil viscosity ratio) by incorporating water soluble viscous agents within the water. Materials that have been suggested for this purpose include a wide variety of naturally occurring gums and polymers. These materials, however, have been observed to be somewhat unstable and to decrease in effectiveness due to loss in viscosity under reservoir conditions. Also, many of them clog the pores of oil reservoirs, and consequently, tend to greatly increase the resistance to flow of fluids within these reservoirs and to thereby hamper a flooding program.

It has also been suggested to employ aqueous solutions of certain synthetic polymers such as the copolymers of methyl vinyl ether and maleic anhydride, polyacrylic acid, sodium polymethacrylate, acrylamide-acrylic acid copolymer, poly vinyl pyridine, etc. All of these solutions are characterized by viscosities that are greater than that of water and accordingly would be more attractive than water as flooding media. With regard to these types of aqueous solutions, however, it has been observed that their viscosities are greatly decreased when they are aged at elevated temperatures such as those normally encountered in oil reservoirs.

In accordance with the specific adaptation of the present invention, an improved class of water thickening agents is utilized consisting of the alcohol adducts of copolymers of ethylenically unsaturated compounds and maleic anhydride, as pointed out heretofore. These materials show a marked improvement in thermal stability over unmodified copolymers of maleic anhydride, due to the presence of the half ester group

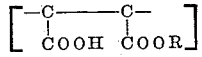

instead of the dicarboxylic group

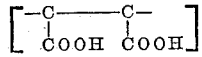

present in the unmodified hydrolysis product of maleic anhydride copolymers. Variation of the R group does not affect the basic improvement in thermal stability of the polymer.

The copolymers of ethylenically unsaturated compounds and maleic anhydride are produced by copolymerizing vinyl compounds, such as styrene, vinyl toluene, vinyl napthalene and the like with maleic anhydride. These materials are obtained in high molecular weights by using azobisisobutyronitrile as catalyst, and polymerizing at low temperatures, such as 30°–60° C. Other catalysts can be used, such as benzoyl peroxide and cumene hydroperoxide. Specific ethylenically unsaturated compounds exemplifying monomers that may be copolymerized with maleic anhydride are as follows: styrene, vinyl toluene, α-methyl styrene, β-chlorostyrene, vinyl naphthalene, ethylene, propylene, iso-butylene, ethyl acrylate, and methyl methacrylate.

The compounds of the present invention are prepared by copolymerizing an ethylenically unsaturated compound with maleic anhydride and then reacting the copolymer with an alcohol to convert the anhydride groups to half ester-half acid groups. Satisfactory alcohols are those having from about 1 to 4 carbon atoms. Particularly desirable alcohols are methyl alcohol, ethyl alcohol and isopropyl alcohol. Mixtures of these alcohols may be used.

The invention may be more fully understood by the following example illustrating the same.

EXAMPLE I

Styrene and maleic anhydride were copolymerized by heating these compounds in a ratio of 34.7 g. of styrene ot 32.7 g. of anhydride at 45° C. The solvent employed was about 200 ml. of methyl ethyl ketone. Azobisisobutyronitrile was used as an initiator. The polymer was then precipitated from methyl ethyl ketone by the addition of 200 ml. of methanol. This polymer was then divided into three equal parts, and the portions heated with 1,000 ml. each of methyl alcohol, ethyl alcohol and isopropyl alcohol, respectively, until the polymer was dissolved. The esterified copolymer was then precipitated with 10% aqueous sodium chloride, washed with water, dried and dissolved in a synthetic salt solution.[1]

Heat aging tests on the methyl, ethyl, and isopropyl esters of styrene-maleic anhydride copolymers indicate that the stability of styrene-maleic anhydride copolymers can be markedly improved by esterification. The following table compares the stability at 212° F. of a styrene-maleic anhydride copolymer with that of the esters prepared from it.

*Heat Stability of Esterified Styrene-Maleic Anhydride Copolymers*

| Ester | Percent concentration, in lake water | pH | Brookfield viscosity cp. at 140° F.[1] | Hrs.[2] at 212° F. | Percent viscosity retention |
|---|---|---|---|---|---|
| Not esterified | 0.30 | 8.0 | 14.0 | 24 | 33 |
| Methyl | 0.45 | 10.8 | 5.8 | 140 | [3]138 |
| Ethyl | 0.40 | 9.5 | 9.4 | 115 | 97 |
| Isopropyl | 0.40 | 8.6 | 13.8 | 118 | 43 |

[1] Taken with U.L. Adapter at 30 r.p.m.
[2] Under nitrogen.
[3] Retains 145% viscosity after 24 hrs. at 212° F.

The methyl and ethyl esters have outstanding heat stability, whereas the iso-propyl ester shows moderate improvement. In addition, they retain the advantageous characteristics of styrene-maleic anhydride copolymers with respect to water thickening in secondary recovery: (1) high viscosity in salt solutions at low polymer concentrations (2) low plugging tendency in reservoir formations (3) stability of viscosity over broad pH region.

The alcohol adducts of these copolymers fulfill the following requirements:

(1) High viscosities in salt solutions at low concentrations of polymer.
(2) Stability of aqueous solutions at elevated temperatures for extended periods of time.
(3) Low plugging tendency in reservoir formations.
(4) Stability of viscosity over a broad pH region.

The molecular weights of the polymers of the present invention should be in excess of about 100,000. In general, preferred polymers should be above about 500,000, preferably, above 1,000,000. The molecular weights may be as high as 3,000,000 to 5,000,000, or up to 10,000,000 and higher. When a polymer has a molecular weight in the range from 500,000 to 1,000,00, it should be used in the concentration of less than about 1% by volume, preferably, in the range from 0.1 to 0.5% by volume.

The required viscosity of the viscous water solution depends on a number of characteristics of the system in which it is applied:

(A) Viscosity of crude to be displaced
(B) Wetting characteristics of the reservoir
(C) Relative permeability to oil and water To obtain an advantage with viscous water, the viscosity does not have to equal the viscosity of the crude oil, but should be high enough to give a favorable mobility ratio.[1] For example, a particular reservoir which is water wet and contains a crude with 40 cp. average viscosity at reservoir temperature, would require a 12–15 cp. solution of thickener for efficient flooding.

Stability of viscous solutions may be defined as follows:

Heat aging—the exposure of the material to elevated temperatures for certain periods of time; for example, refluxing at atmospheric pressure under a blanket of nitrogen for a specified period of time. The percent viscosity retention may be taken as a measure of stability to heat aging.

What is claimed is:

1. A method of recovering oil from oil bearing formations, comprising flooding the oil bearing formation with water containing as a viscosity thickening agent an effective amount of an alcohol adduct of a copolymer of a vinyl aromatic and maleic anhydride wherein said adduct comprises a half ester.

2. The process as defined in claim 1 wherein the molecular weight of said copolymer is above about 200,000.

3. The process as defined in claim 1 wherein the molecular weight of said copolymer is above about 500,000.

4. The process as defined in claim 1, wherein said copolymer is a copolymer of maleic anhydride and vinyl toluene.

5. The process as defined in claim 1 wherein said copolymer is a copolymer of maleic anhydride and ethylene.

6. The process as defined by claim 1 wherein said alcohol adduct is secured by reacting said copolymer with an alcohol containing from about 1 to 5 carbon atoms.

7. The process as defined by claim 6 wherein said alcohol is methyl alcohol.

8. The process as defined by claim 6 wherein said alcohol is ethyl alcohol.

9. The process as defined by claim 6 wherein said alcohol comprises isopropyl alcohol.

10. The process as defined in claim 1 wherein said copolymer is a copolymer of maleic anhydride and styrene.

11. The process as defined in claim 10 wherein the molecular weight of said copolymer is above about 200,000.

12. In a secondary recovery operation for the production of oil from a subterranean reservoir wherein water is used as a driving medium, the improvement which comprises flooding the reservoir with water containing as a viscosity improving agent an effective amount of an alcohol adduct of a copolymer of maleic anhydride and styrene, said copolymer being made by using as a catalyst azobisisobutyronitrile at a temperature in the range from about 30° to 60° C., said copolymer being further char-

---

[1] 40 liters of water contain 2.72 grams sodium bicarbonate, 4.28 grams sodium sulfate, 5.52 grams magnesium chloride, 3.56 grams calcium chloride, 36.5 grams sodium chloride and 2.05 grams aluminum sodium sulfate—
$(Al_2(SO_4)_3Na_2SO_4 \cdot 24H_2O)$

[1] Mobility ratio is defined as follows:

$$M.R. = \frac{K_w V_o}{V_w K_o}$$

where K is permeability, V is viscosity, and subscripts $w$ and $o$ denote water and oil respectively. If M.R. is less than one, it is favorable.

acterized by having a molecular weight in excess of about 200,000.

13. In a secondary recovery operation for the production of oil from a subterranean reservoir wherein water is used as a driving medium, the improvement which comprises flooding the reservoir with water containing as a viscosity improving agent an effective amount of an alcohol adduct of a copolymer of a vinyl aromatic and maleic anhydride.

14. The process as defined by claim 13 wherein said vinyl aromatic comprises vinyl naphthalene.

References Cited in the file of this patent

UNITED STATES PATENTS

| | | |
|---|---|---|
| 2,718,497 | Oldham et al. | Sept. 20, 1955 |
| 2,827,964 | Sandiford et al. | Mar. 25, 1958 |
| 2,842,492 | Engelhardt et al. | July 8, 1958 |